United States Patent
Sasaki (10) Patent No.: US 8,218,961 B2
(45) Date of Patent: Jul. 10, 2012

(54) AUTOFOCUS SYSTEM

(75) Inventor: Tadashi Sasaki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/751,402

(22) Filed: Mar. 31, 2010

(65) Prior Publication Data

US 2010/0254690 A1 Oct. 7, 2010

(30) Foreign Application Priority Data

Apr. 7, 2009 (JP) ................................ P2009-093115

(51) Int. Cl.
*G03B 3/10* (2006.01)
*G03B 3/00* (2006.01)
(52) U.S. Cl. .......................................... 396/95; 396/104
(58) Field of Classification Search ................... 396/95, 396/103, 104, 124, 125; 348/349
See application file for complete search history.

(56) References Cited

U.S. PATENT DOCUMENTS

| | | |
|---|---|---|
| 2006/0210260 A1 | 9/2006 | Yata |
| 2007/0201851 A1 | 8/2007 | Misawa et al. |
| 2009/0244325 A1 * | 10/2009 | Honjo et al. ............. 348/231.99 |

FOREIGN PATENT DOCUMENTS

| | | | |
|---|---|---|---|
| JP | 2003-75717 A | | 3/2003 |
| JP | 2005189087 A | * | 7/2005 |
| JP | 2006-258944 A | | 9/2006 |
| JP | 2007-232793 A | | 9/2007 |

OTHER PUBLICATIONS

JP-2005189087 A Machine Translation available from JPO website.*

* cited by examiner

*Primary Examiner* — W. B. Perkey
*Assistant Examiner* — Minh Phan
(74) *Attorney, Agent, or Firm* — Birch, Stewart, Kolasch & Birch, LLP (57) ABSTRACT

An autofocus system includes: an image pickup unit that takes a subject image formed by an optical system; a target subject detection unit that detects a target subject, which is previously registered as an autofocus target, in a photographing image taken by the image pickup unit; a lens-to-subject distance calculation unit that calculates a lens-to-subject distance to the target subject based on information on a photographing angle of view depending on a focal length of the optical system, a size of the target subject in the photographing image, and a size of the target subject in real space; and a rough AF unit that controls a focus of the optical system so as to bring into focus the subject which is located at the lens-to-subject distance calculated by the lens-to-subject distance calculation unit.

3 Claims, 8 Drawing Sheets

IMAGE PICKUP SCREEN

FIG. 9

AUTOFOCUS SYSTEM

CROSS-REFERENCE TO RELATED APPLICATIONS

This application is based on and claims priority under 35 USC 119 from Japanese Patent Application No. 2009-093115 filed on Apr. 7, 2009; the entire contents of which are incorporated herein by reference.

BACKGROUND

1. Technical Field

The present invention relates to an autofocus system, particularly, to an autofocus system which does not cause a large difference in focus even during high-speed zooming.

2. Related Art

In television cameras for broadcast or business, there are cameras equipped with an autofocus (AF) system for automatically bring a desired subject into focus. In such camera systems, generally an AF function based on a contrast method is employed, and focusing is performed in a way that the focus of a photographing optical system is controlled so that a captured video has the maximum (largest) contrast by detecting a height of the contrast thereof.

Patent Document 1 (JP-A-2007-232793 corresponding to US-A-2007/0201851) and Patent Document 2 (JP-A-2003-075717) disclose that autofocus methods for controlling the focus based on the lens-to-subject distance to a target subject by detecting the lens-to-subject distance based on the size of the target subject to be brought into focus.

Furthermore, for example, Patent Document 3 (JP-A-2006-258944 corresponding to US-A-2006/0210260) discloses an autofocus system having a AF frame auto-tracking function by which an AF frame (an AF area) as an area brought into focus by the AF function automatically tracks a desired target subject (a tracking target subject) to be brought into focus.

However, in the general camera work of a cameraman, a photography target subject (the target subject to be brought into focus) is captured on a photographing screen by setting the zoom range to the wide side, and the zoom range is set to the telephoto side so that the target subject has an appropriate size on the photographing screen. At this time, the AF function based on the contrast method may be used. In this case, even in a state where it is determined that the target subject is appropriately brought into focus when the zoom range is set to the wide side, the range of the focal position, in which it is determined that the subject is visually in focus, is large. Hence, when the zoom range is rapidly changed to the telephoto side, it is difficult to follow the AF processing, and thus the target subject is out of focus by a large amount. Accordingly, a problem arises in that focusing is stopped in the above-mentioned state since the AF function is not available.

Further, similarly to Patent Documents 1 and 2, the lens-to-subject distance is detected based on the size of the target subject, and the AF method of controlling the focus based on the detected lens-to-subject distance is employed. With such a configuration, it may be possible to handle the focus control based on the AF function in accordance with the rapid change in zoom range. However, in Patent Document 1, it is not considered that the focal position at which the target subject is precisely brought into focus is changed in accordance with the change in zoom range (the change in focal length).

SUMMARY

An object of the invention is to provide an autofocus system that does not cause a large difference in focus even during high-speed zooming (during change in focal length).

[1] According to an aspect of the invention, an autofocus system includes: an image pickup unit that takes a subject image formed by an optical system; a target subject detection unit that detects a target subject, which is previously registered as an autofocus target, in a photographing image taken by the image pickup unit; a lens-to-subject distance calculation unit that calculates a lens-to-subject distance to the target subject based on information on a photographing angle of view depending on a focal length of the optical system, a size of the target subject in the photographing image, and a size of the target subject in real space; and a rough AF unit that controls a focus of the optical system so as to bring into focus the subject which is located at the lens-to-subject distance calculated by the lens-to-subject distance calculation unit.

[2] According to the autofocus system of [1], the autofocus system may further include a normal AF unit that controls the focus of the optical system so as to obtain an in-focus state in which a contrast of an image within an area of a predetermined AF frame in the photographing image taken by the image pickup unit becomes the maximum. The control of the focus may be performed by the rough AF unit when the in-focus state is not obtained by the normal AF unit.

[3] According to the autofocus system of [1], the autofocus system may further include a normal AF unit that controls the focus of the optical system so as to obtain an in-focus state in which a contrast of an image within an area of a predetermined AF frame in the image taken by the image pickup unit becomes the maximum. The control of the focus may be performed by the rough AF unit when a speed of change in focal length of the optical system is equal to or more than a threshold value, and the control of the focus is performed by the normal AF unit when the speed of change in focal length of the optical system is less than the threshold value.

With the configurations of [1] to [3], a large difference in focus is not caused even during high-speed zooming (during change in focal length).

DETAILED DESCRIPTION

Hereinafter, an autofocus system according to an exemplary embodiment of the invention will be described with reference to the accompanying drawings.

Figure 1:
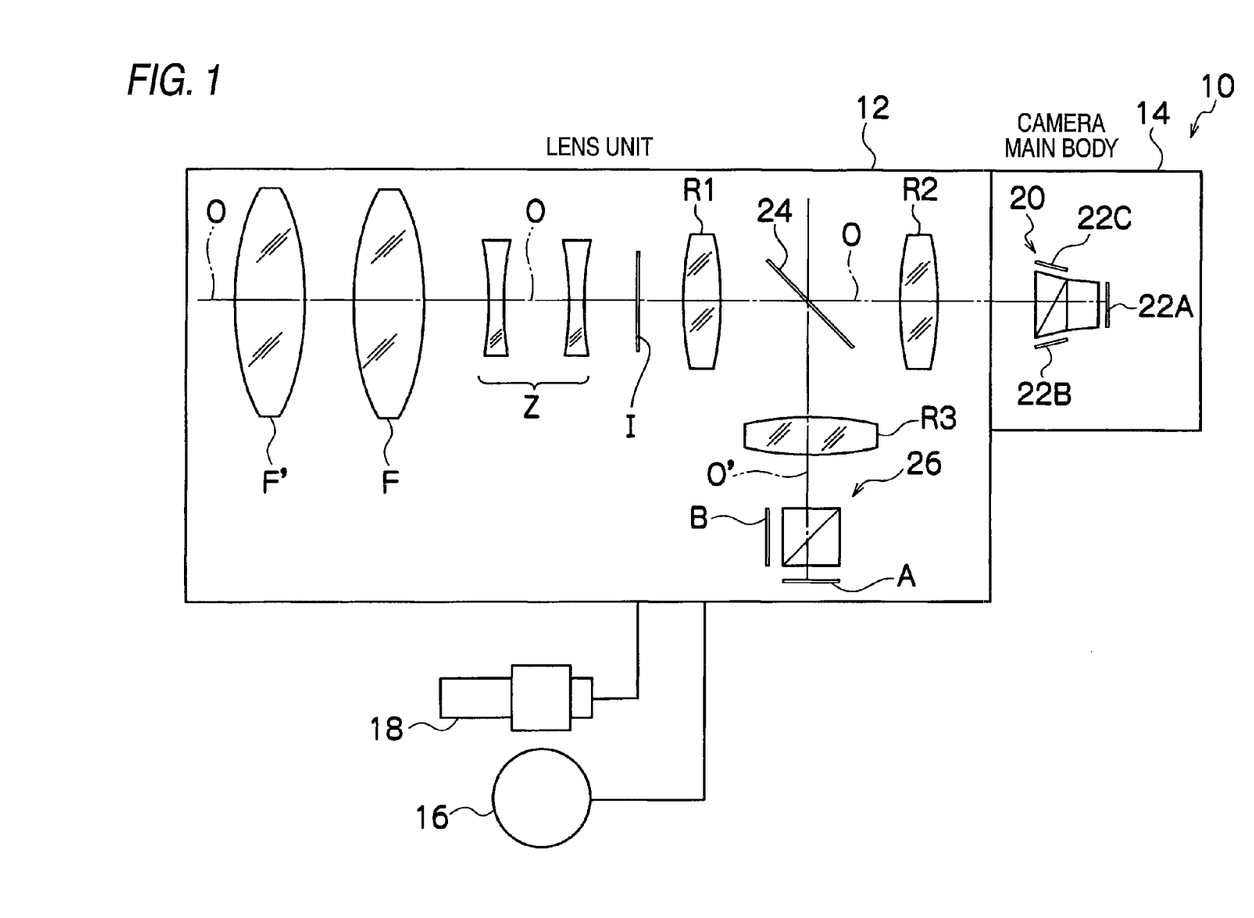
FIG. 1 is a configuration diagram illustrating an entire configuration of a television camera system according to an embodiment of the invention.

FIG. 1 is a configuration diagram illustrating the entire configuration of a television camera system according to an embodiment of the invention. The television camera system shown in the drawing includes a lens unit 12 having a photographing lens (an optical system), a television camera 10 for broadcast or business constituted by a camera main body 14 on which the lens unit 12 is detachably mounted, a focus/AF-frame operation unit 16 electrically connected to the lens unit 12 via a cable, and a zoom demand 18.

The lens unit 12 includes the photographing lens (the optical system) for forming a subject image, various lenses constituting the optical system, and a control system for controlling an iris diaphragm. The camera main body 14 includes an image pickup section 20 for converting a subject image, which is formed by the optical system of the lens unit 12, into an electric signal, and a signal processing section for generating a video signal based on a predetermined system for recording/reproduction by performing predetermined processing on the signal output from the image pickup section 20.

The optical system of the lens unit 12 includes a video-supported optical system of forming a subject image for video (recording/reproduction) on the image pickup section 20 of the camera main body 14, and an AF-supported optical system for forming a subject image for autofocus (AF) to be described later in detail.

The video-supported optical system includes, as shown in the lens unit 12 shown in the drawing, a focus lens F' which remains stationary from the front side (the subject side) and a focus lens F which is movable therefrom, a zoom lens Z formed of a power variation system and a correction system, an iris I, and a relay lens (relay optical system) formed of a front relay lens R1, a half mirror 24, and, a rear relay lens R2. Furthermore, the configuration of the respective lenses is simplified, and a lens group formed of a plurality of lenses may be shown as a single lens.

A subject ray incident from the front side of the video-supported optical system exits from the rear side thereof through the video-supported optical system, and is incident on the image pickup section 20 of the camera main body 14. The subject ray incident on the image pickup section 20 of the camera main body 14 is separated into three rays of red, green, and blue by, for example, a color separation optical system, and is incident on the image pickup surface of the video-supported image pickup devices 22A, 22B, and 22C (for example, CCDs) corresponding to the respective colors. With such a configuration, a color video for recording and reproduction is captured by the image pickup section 20.

On the other hand, a half mirror 24, which is tilted at approximately 45 degrees about an optical axis O of the video-supported optical system, is disposed between the front relay lens R1 and the rear relay lens R2 of the relay optical system. By using the half mirror 24, a subject ray for AF function, which is for forming a subject image for AF function, diverges from a subject ray for video, which is guided into the image pickup section 20 of the camera main body 14, and the subject ray for AF function is guided into an AF-supported optical system with an optical axis O' which is orthogonal to the optical axis O of the video-supported optical system.

The AF-supported optical system includes a relay lens R3, which has the same properties as the rear relay lens R2 of the video-supported optical system, and an AF-supported image pickup section 26. The subject ray for AF function, which is guided into the AF-supported optical system, passes through the relay lens R3, forms images on image pickup surfaces of respective image pickup devices A and B (for example, CCDs) of the AF-supported image pickup section 26. Although not described in detail, the image pickup section 26 includes two prisms (light separation optical systems) and the two image pickup devices A and B. The subject ray for AF function incident on the light separation optical systems is separated into two subject rays having equivalent light amounts. Then, the separated subject rays form subject images (subject images for AF function) in which the subject is brought into focus on the image pickup surfaces of the image pickup devices A and B at a distance substantially equal to those of the video-supported image pickup devices 22 (22A, 22B, and 22C). Furthermore, in order to be distinguished from the video-supported image pickup devices 22 (22A, 22B, and 22C), the image pickup devices A and B are referred to as the AF-supported image pickup devices A and B. Further, it is not necessary for the AF-supported image pickup devices A and B to capture a color video, and the devices have only to capture a black-and-white image (to acquire a brightness signal of the subject image).

Figure 2:
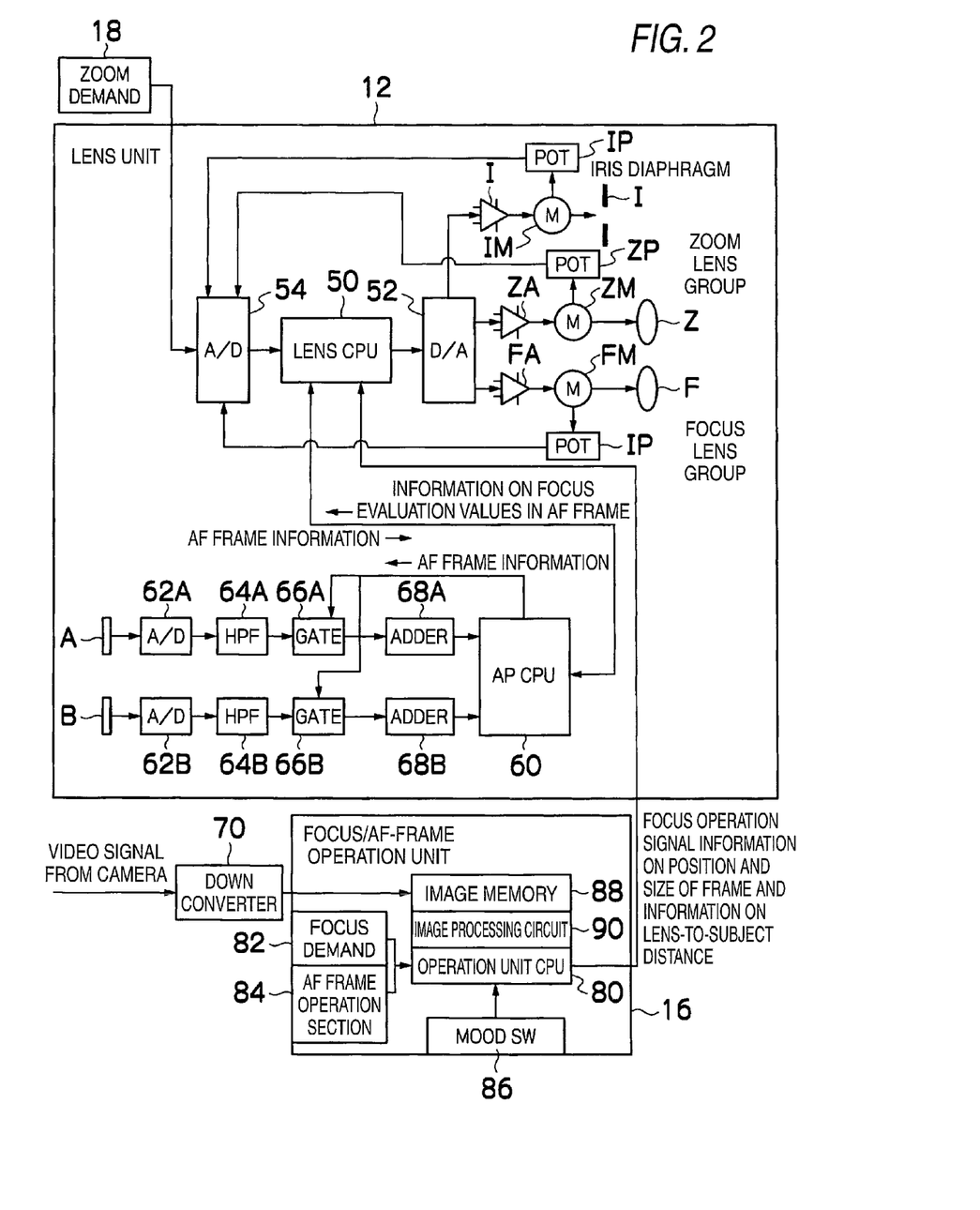
FIG. 2 is a block diagram illustrating a configuration of a control system of a lens unit and a focus/AF-frame operation unit.

FIG. 2 is a block diagram illustrating a configuration of the control system of the lens unit 12 and the focus/AF-frame operation unit 16.

In the drawing, a focus lens F, a zoom lens Z, and an iris I constituting the optical system of the lens unit 12 are shown, and are driven by motors FM, ZM, and IM. The lens unit 12 includes a lens CPU 50, which controls the overall system, as a component of the control system of the lens unit 12. The lens CPU 50 sends driving signals to respective amplifiers FA, ZA, and IA of the respective motors FM, ZM, and IM through a D/A converter 52, and the motors FM, ZM, and IM are driven at speeds corresponding to voltages of the driving signals. Accordingly, the lens CPU 50 controls the focus lens F, the zoom lens Z, and the iris I to have desired operation speeds.

Further, position signals representing the rotation positions of the motors FM, ZM, and IM are output from potential meters FP, ZP, and IP, and are sent through the A/D converter 54 to the lens CPU 50. With such a configuration, the lens CPU 50 reads out the positions of the focus lens F, the zoom lens Z, and the iris I. Accordingly, the lens CPU 50 controls the operation speeds of the focus lens F, the zoom lens Z, and the iris I while reading out positions of the focus lens F, the zoom lens Z, and the iris I, and thus is able to control the focus lens F, the zoom lens Z, and the iris I to be located at desired positions.

Meanwhile, in the lens CPU 50, for example, control of the focus lens F is performed in response to AF processing or an instruction signal given from the focus/AF-frame operation unit 16 to be described later in detail. In addition, control of the zoom lens Z is performed in response to an instruction signal given from the zoom demand 18 through the A/D converter 54 based on the operation of the operation member manually operated by an operator. In addition, control of the iris I is performed in response to an instruction signal not shown in the drawings) given from the camera main body 14.

Control of the focus lens F (focus control) has, as control modes of the focus control, an AF mode for performing the focus control based on the AF function and an MF mode for performing a focus control based on a manual focus (MF).

Figure 3:
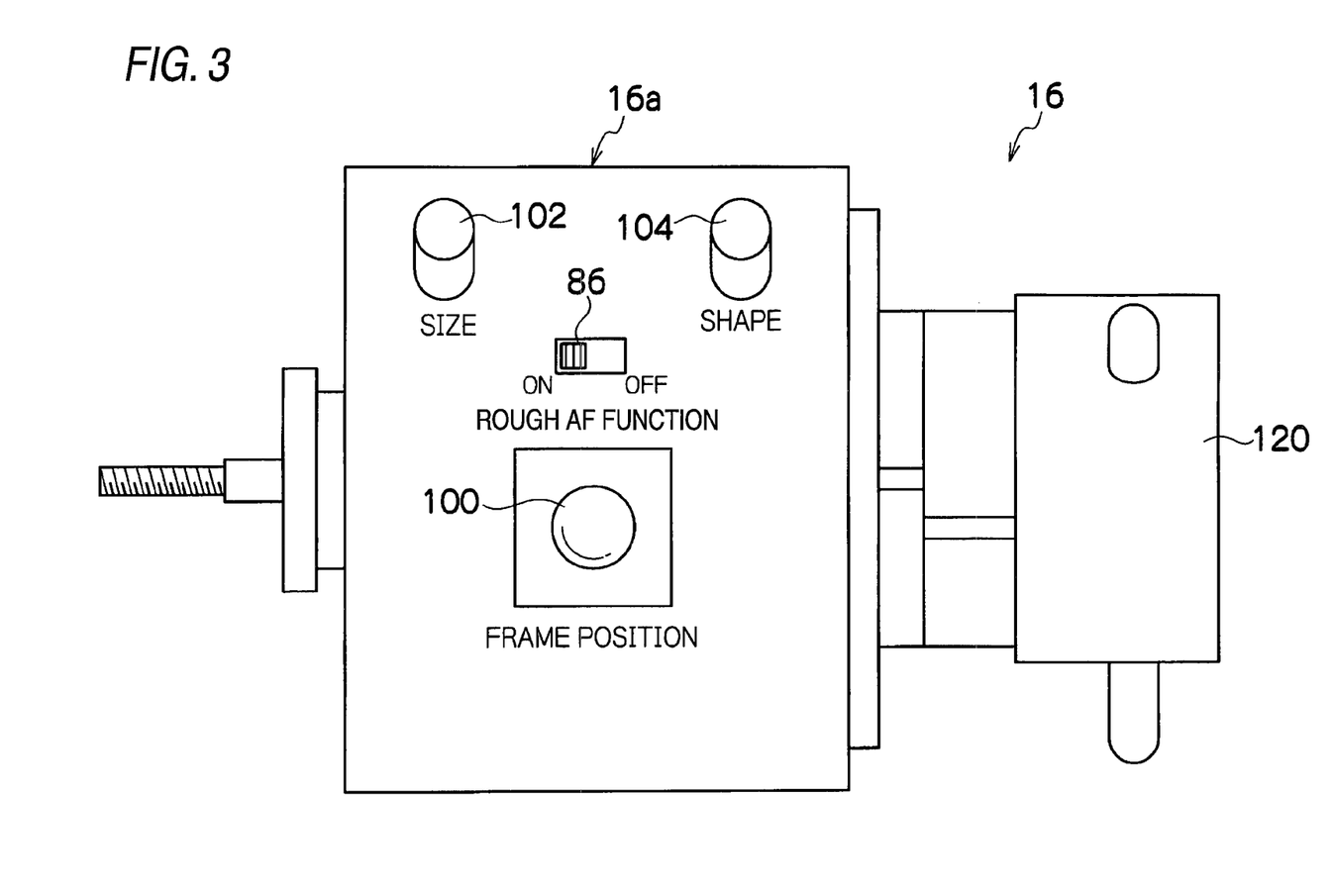
FIG. 3 is an exterior view illustrating an exterior of the focus/AF-frame operation unit.

Here, the focus/AF-frame operation unit 16 is formed by combining a known controller, which is called a focus demand, having an operation member (a focus ring) for manually adjusting the focus and the like with an AF frame control unit for performing control of AF frame to be described later. In the focus/AF-frame operation unit 16 shown in FIG. 2, the block noted as a focus demand 82 represents the known focus demand. FIG. 3 is an exterior view illustrating an exterior of the focus/AF-frame operation unit 16. In the drawing, a focus ring 120 is rotatably provided on a main body section 16a. The focus ring 120 is an operation member constituting the focus demand 82. The focus demand 82 outputs an instruction signal for instructing the focus lens F to move to a position corresponding to the rotation position of the focus ring 120, and an operation unit CPU 80 of the focus/AF-frame operation unit 16 transmits the instruction signal to the lens CPU 50 through, for example, serial communication. Further, the focus demand 82 is provided with a mode selection switch (not shown in the drawings) for allowing an operator to select which control mode of the AF mode and the MF mode to perform the focus control. On the basis of a state of the mode selection switch, a signal representing the selected control mode is transmitted to the lens CPU 50 through the operation unit CPU 80.

When receiving the signal, which represents selection of the MF mode, from the operation unit CPU 80, the lens CPU 50 performs processing (MF processing) for performing the focus control based on the MF function. Specifically, based on the rotation position of the focus ring 120 of the focus/AF-frame operation unit 16 (the focus demand 82), the position of the focus lens F is controlled so as to be in a position (a target position) designated by the instruction signal which is given from the operation unit CPU 80.

In contrast, when receiving the signal, which represents selection of the AF mode, from the operation unit CPU 80, the lens CPU 50 performs processing (AF processing) for performing the focus control based on the AF function, and automatically adjusts the focus.

Here, the AF function is described as follows. In the embodiment, it is possible to perform the focus control by using an AF (normal AF) function which has a high precision based on a optical path length difference method (a contrast method) and a rough AF function which has a lower precision than the normal AF function but enables high-speed focusing. When the AF mode is selected as described above, the normal AF function is successively performed as a general rule. In contrast, when the rough AF mode is on, the focus control is performed based on the rough AF function in priority to the normal AF function under a situation in which the subject is not in focus by using the normal AF function. Further, on and off states of the rough AF mode can be selected by an operator with the aid of the mode switch 86 in FIGS. 2 and 3.

Figure 4:
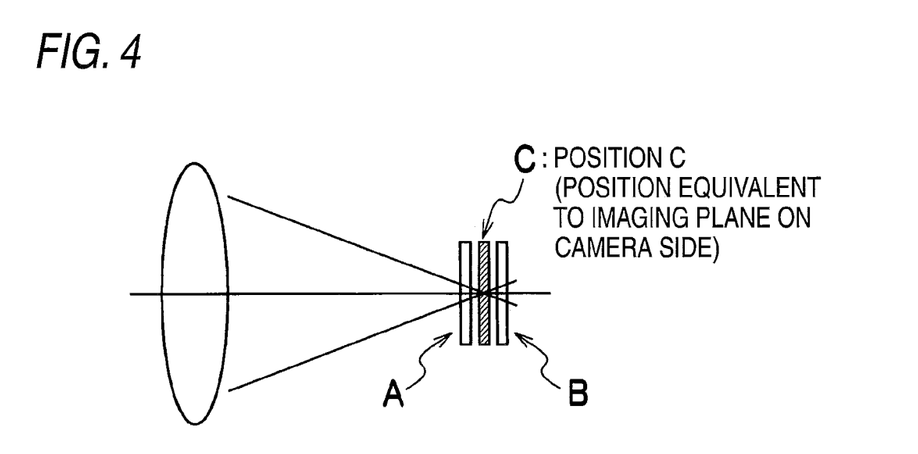
FIG. 4 is an explanatory diagram illustrating arrangement of an AF-supported image pickup device.

First, the normal AF function is described as follows. The normal AF function employs the AF function based on the optical path length difference method using the AF-supported image pickup devices A and B of the AF-supported optical system shown in FIGS. 1 and 2. In the AF-supported image pickup devices A and B, the optical axes of the AF-supported image pickup devices A and B are shown to be on the same straight line as shown in FIG. 4. In this case, the optical path lengths of the subject rays incident on the respective image pickup surfaces of the AF-supported image pickup devices A and B are different from each other. In addition, the image pickup surfaces of the AF-supported image pickup devices A and B are disposed at front and rear positions equidistant from a position C at which the lengths coincide with optical path lengths to the image pickup surfaces of the video-supported image pickup devices 22 (22A, 22B, and 22C) of the camera main body 14.

Figure 5:
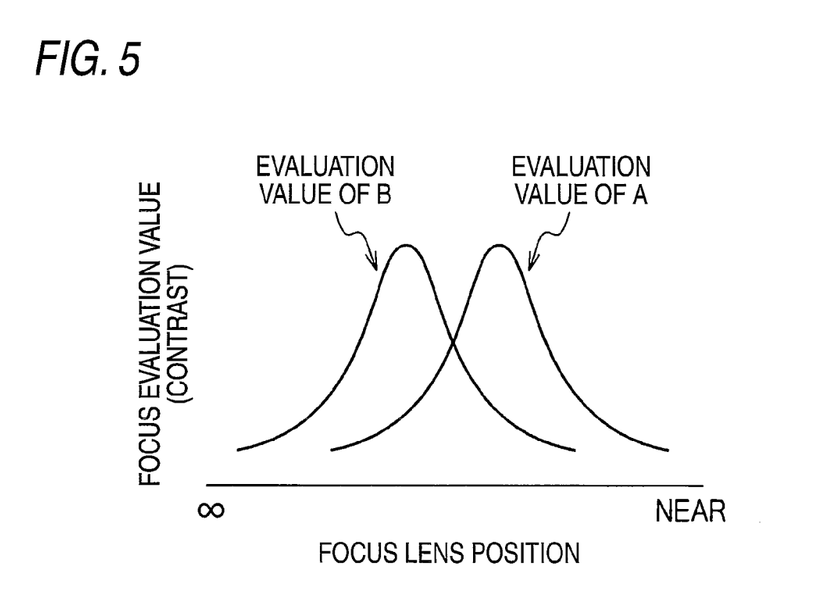
FIG. 5 is a diagram illustrating a relationship between a focal position and a focus evaluation value (a contrast) obtained from the AF-supported image pickup device.

At this time, it is assumed that the subject, of which the state does not change, is captured while changing the position of the focus lens F (the focal position) from the infinite object side to the near object side. Under this assumption, contrasts (focus evaluation values) of the respective images taken by the AF-supported image pickup devices A and B change as shown in FIG. 5.

Although not described in detail, in comparison between the focus evaluation values of the images taken by the AF-supported image pickup devices A and B, when their focus evaluation values coincide with each other, it can be determined that the subject is in focus on the video-supported image pickup devices 22 of the video-supported optical system. Consequently, the contrast of the image of each video-supported image pickup device 22 becomes the maximum.

On the other hand, when the focus evaluation value of the AF-supported image pickup device A is larger, it is determined that focus is in front of the subject. In contrast, when the focus evaluation value of the AF-supported image pickup device B is larger, it is determined that focus is behind the subject.

In the case of the AF mode, the lens CPU 50 detects a focus state by acquiring the focus evaluation values of the images, which are taken by the AF-supported image pickup devices A and B, from an AF CPU 60 as described later. Then, based on the focus state, the lens CPU 50 moves the focus lens F, and sets the focus lens F to a position at which the subject is in focus.

In FIG. 2, video signals (brightness signals) of videos (videos for AF function) captured by the AF-supported image pickup devices A and B undergoes A/D converters 62A and 62B, high pass filters (HPF) 64A and 64B, gate circuits 66A and 66B, and adder circuits 68A and 68B. Then, the focus evaluation values are calculated in units of one frame (one screen), and read by the AF CPU 60.

Specifically, first, the video signals of the video for the AF function captured by the AF-supported image pickup devices A and B is converted into a digital signal by the A/D converters 62A and 62B, and subsequently only high frequency components of those are extracted by the HPFs 64A and 64B. Then, from the high-frequency component video signals, the gate circuits 66A and 66B extracts video signals within the AF frames (the AF areas), which will be described later, as areas (AF target areas) of the target subject brought into focus by the AF function. Then, the values of the video signals within the AF frames are added by the adder circuits 68A and 68B for each one frame, thereby calculating the focus evaluation values.

Furthermore, the areas of the AF frames for extracting the video signals by using the gate circuits 66A and 66B are set by the AF CPU 60. The AF CPU 60 sets the areas of the AF frames based on the AF frame information acquired from the focus/AF-frame operation unit 16 through the lens CPU 50. The detailed description thereof will be described later.

Subsequently, the rough AF function is described as follows. The rough AF function employs a method that measures a distance (a lens-to-subject distance) to the target subject based on dimensions (a size) of the target subject brought into focus on the image pickup screen of the video-supported image pickup device 22, actual dimensions (the real size) of the target subject in real space, and the photographing angle of view (the focal length) at that time, and controls the focus based on the lens-to-subject distance. The rough AF function is performed under the situation in which it is determined that the subject is not in focus by using the normal AF function. The situation, in which it is determined that the subject is not brought into focus by the normal AF function, includes, for example, a case where focusing based on the normal AF function is not possible (for example, a case where an image is significantly blurred). The measuring of the lens-to-subject distance in the rough AF function is performed in the focus/AF-frame operation unit 16.

Figure 6:
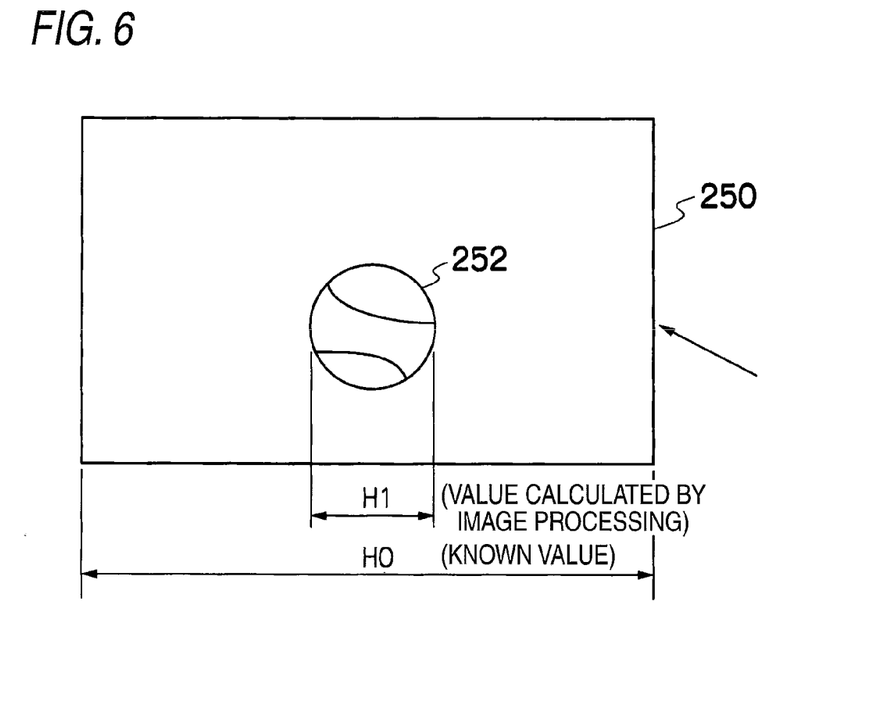
FIG. 6 is an explanatory diagram illustrating a principal of a rough AF function.

Here, a principle of the rough AF function is described as follows. As shown in FIG. 6, a ball 252 as a target subject of the rough AF function is brought into focus on a screen (an image pickup screen) 250 of the image captured by the video-supported image pickup device 22. At this time, a horizontal size of the image pickup screen 250 is defined as H0 (mm), and a horizontal size of the ball 252 in the image pickup screen is defined as H1 (mm).

Figure 7:
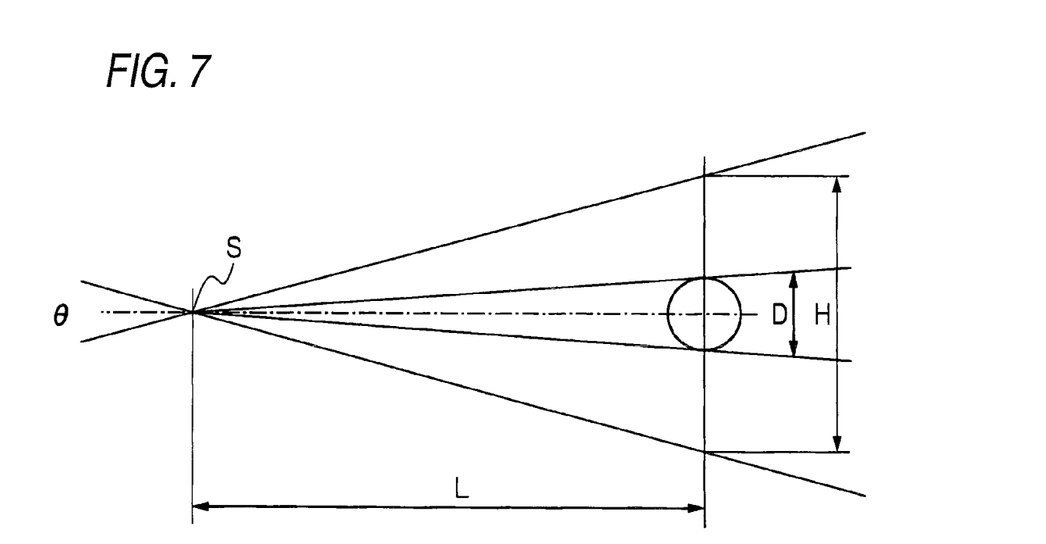
FIG. 7 is an explanatory diagram illustrating a principal of the rough AF function.

Further, as shown in FIG. 7, the real horizontal size of the ball 252 in real space is defined as D (mm), and the horizontal angle of view determined by the current position of the zoom lens Z of the photographing lens (the video-supported optical system) is defined as θ(°). Furthermore, the point S represents the focal position of the optical system.

At this time, at the position of the ball 252 as shown in FIG. 7, the horizontal distance H (mm) in real space in the range of the horizontal angle of view is given by the following Expression (1).

$$H = D \cdot H0 / H1 \quad (1)$$

Accordingly, the distance (a lens-to-subject distance) L (mm) from the focus of the photographing lens to the ball which is the target subject is given by the following Expression (2).

$$L = (H/2)/\tan(\theta/2) \quad (2)$$

Here, the horizontal size H0 of the image pickup screen is a known value, the horizontal size H1 of the ball 252 in the image pickup screen is the size measured when the lens-to-subject distance L is calculated, the real horizontal size D of the ball 252 is the value which is previously registered, and the horizontal angle of view θ is the value calculated based on the position of the zoom lens Z (the focal length) when the lens-to-subject distance L is calculated. Accordingly, in order to perform the rough AF function effectively, it is necessary to previously register the real horizontal size D of the target subject of the rough AF function. Furthermore, the target subject of the rough AF function is not limited to the ball 252, and may be an optional object.

The above-mentioned calculation of the lens-to-subject distance L is performed in the focus/AF-frame operation unit 16. As shown in FIG. 2, the focus/AF-frame operation unit 16 is configured to receive an input of the video signal of the video captured by the video-supported image pickup device 22 of the camera main body 14 through the down converter 70. The images captured in units of one frame are sequentially loaded from the video signal, which is converted down to an appropriate resolution by the down converter 70, and recorded in the image memory 88. The image processing circuit 90 sets a tracking target subject, which is automatically tracked by using the AF frame, as a target subject to be brought into focus in the AF frame auto-tracking processing as described later, while the circuit performs a cross-check between the tracking target subject and the target subject of the rough AF function in which the subject image and the real horizontal size D are registered. Furthermore, the subject image and real horizontal size D of the desired subject can be registered previously. For example, by providing a memory (non-volatile memory) mounted on the focus/AF-frame operation unit 16 and a card slot on the focus/AF-frame operation unit 16, the subject image and real horizontal size D may be registered in the memory (an SD card and the like) which can be loaded in the card slot. The registration may be performed by using another apparatus (a PC and the like). In addition, by using the video signal, which is input to the focus/AF-frame operation unit 16, and an AF frame operation section 84, the subject image may be registered in a way that the area of the subject image to be registered is designated by the AF frame. In addition, by providing a numerical input section on the focus/AF-frame operation unit 16, the real horizontal size D of the registered subject image may be registered by the numerical input section.

When the target subject of the rough AF function, in which the subject image and real horizontal size D are registered, is the tracking target subject, the operation unit CPU 80 acquires the real horizontal size D of the subject from the memory in which the value is registered, and acquires the horizontal size H1 of the subject from the image processing circuit 9. Further, the operation unit CPU 80 acquires information on the position (focal length) of the zoom lens Z from the lens CPU 50 of the lens unit 12, thereby obtaining the horizontal angle of view θ. Then, by using the horizontal size H1, the horizontal angle of view θ, the real horizontal size D, and the known horizontal size H0, the operation unit CPU 80 calculates the lens-to-subject distance L based on Expressions (1) and (2) mentioned above, and transmits information on the calculated lens-to-subject distance L to the lens CPU 50 of the lens unit 12 through serial communication.

When the information on the lens-to-subject distance L is given, the lens CPU 50 controls the focus lens F based on the lens-to-subject distance L, and sets the focus lens F to the position at which the target subject located at the lens-to-subject distance L is brought into focus. In such a manner, the focusing based on the rough AF function is performed.

Furthermore, when the position (the focal length) of the zoom lens Z is converted into the horizontal angle of view θ, and when the position of the focus lens F to be set relative to the obtained lens-to-subject distance L is calculated (when the lens-to-subject distance L is converted into the position of the focus lens F), errors are likely to occur. Hence, when precision is necessary, it is preferable to perform correction based on actual measurement values.

Figure 8:
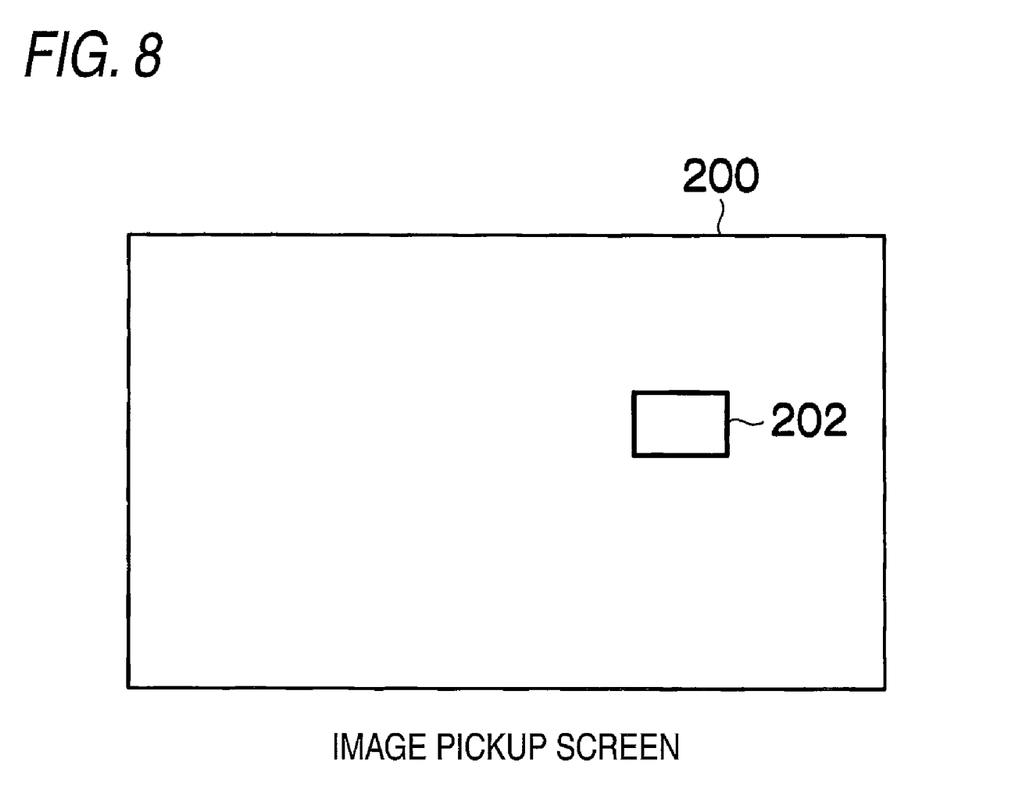
FIG. 8 is an explanatory diagram illustrating an AF frame.

Next, control of the AF frame will be described. As shown in FIG. 8, the AF frame 202 is set as an outline of the rectangular area (the AF area) on the image pickup screen 200 of the video-supported image pickup device 22, and the subject in the area of the AF frame 202 is brought into focus in the AF mode. In FIG. 2, in the focus/AF-frame operation unit 16, the AF frame control unit for controlling the AF frame as described above is assembled, and the operation unit CPU 80 for controlling the overall system is provided. The operation unit CPU 80 determines the area of the AF frame including position, size, and shape (aspect ratio), and transmits the AF frame information representing the area of the AF frame to the lens CPU 50 through serial communication. In such a manner, the area of the AF frame is given from the lens CPU 50 to the AF CPU 60 as described above, and the ranges of the video signals extracted by the gate circuits 66A and 66B are set as the area of the AF frame given from the operation unit CPU 80 of the focus/AF-frame operation unit 16.

On the other hand, as control modes of the AF frame, it is possible to select a manual mode for allowing the operator to set the AF frame manually to a desired position on the photographing screen, and an AF frame auto-tracking mode for automatically changing the area of the AF frame to the position (the area) of the predetermined tracking target subject on the photographing screen. The control mode of the AF frame is changed by the mode switch which is not shown in the drawing.

In the case of the manual mode, the operation unit CPU 80 determines the area of the AF frame in accordance with the manual operation of the operation member included in the AF frame operation section 84 in FIG. 2. In FIG. 3, the operation members included in the AF frame operation section 84 in FIG. 2 are a position operation member 100 (a track ball) provided on the main body section 16a of the focus/AF-frame operation unit 16, a size operation member 102 (a handle), and a shape operation member 104 (a handle). Those are operation members for allowing an operator to set manually the position, size, and shape of the AF frame. The operation unit CPU 80 determines the area of the AF frame based on the setting states of the operation members 100, 102, and 104. Furthermore, the information on the currently set area of the AF frame is given to, for example, the camera main body 14, and is displayed on the monitor, which is installed in the camera main body, so as to be superimposed upon the captured video. With such a configuration, an operator is able to perform operations relating to the AF frame while verifying the area of the current AF frame.

On the other hand, in the case of the AF frame auto-tracking mode, the area of the tracking target subject is detected based on the video captured by the video-supported image pickup device 22 of the camera main body 14, and the area of the operation unit CPU 80 is determined as the area of the AF frame. Furthermore, even in the AF frame auto-tracking mode, when the operation members 100, 102, and 104 for manually operating the area of the AF frame are operated similarly to the manual mode, the area of the AF frame is set in accordance with the operations.

The signal of video, which is captured by the video-supported image pickup device 22 of the camera main body 14 and is output from the camera main body 14, is converted down into an appropriate resolution by the down converter 70, and is subsequently input to the focus/AF-frame operation unit 16. Then, the images in units of one frame are sequentially stored in the image memory 88 of the focus/AF-frame operation unit 16.

The image processing circuit 90 detects the area matched with an image of a reference pattern previously registered in the images stored in the image memory 88 through pattern matching processing. In the embodiment, the subject image in the area of the initial AF frame in the AF frame auto-tracking mode is set as the reference pattern, and the subject is set as the tracking target. The operation unit CPU 80 sets the area, in which the reference pattern is detected by the image processing circuit 90, as the area of the tracking target subject, and determines the area as the area of the AF frame. By sequentially repeating the processing, a change is made so that the AF frame tracks the tracking target subject.

Figure 9:
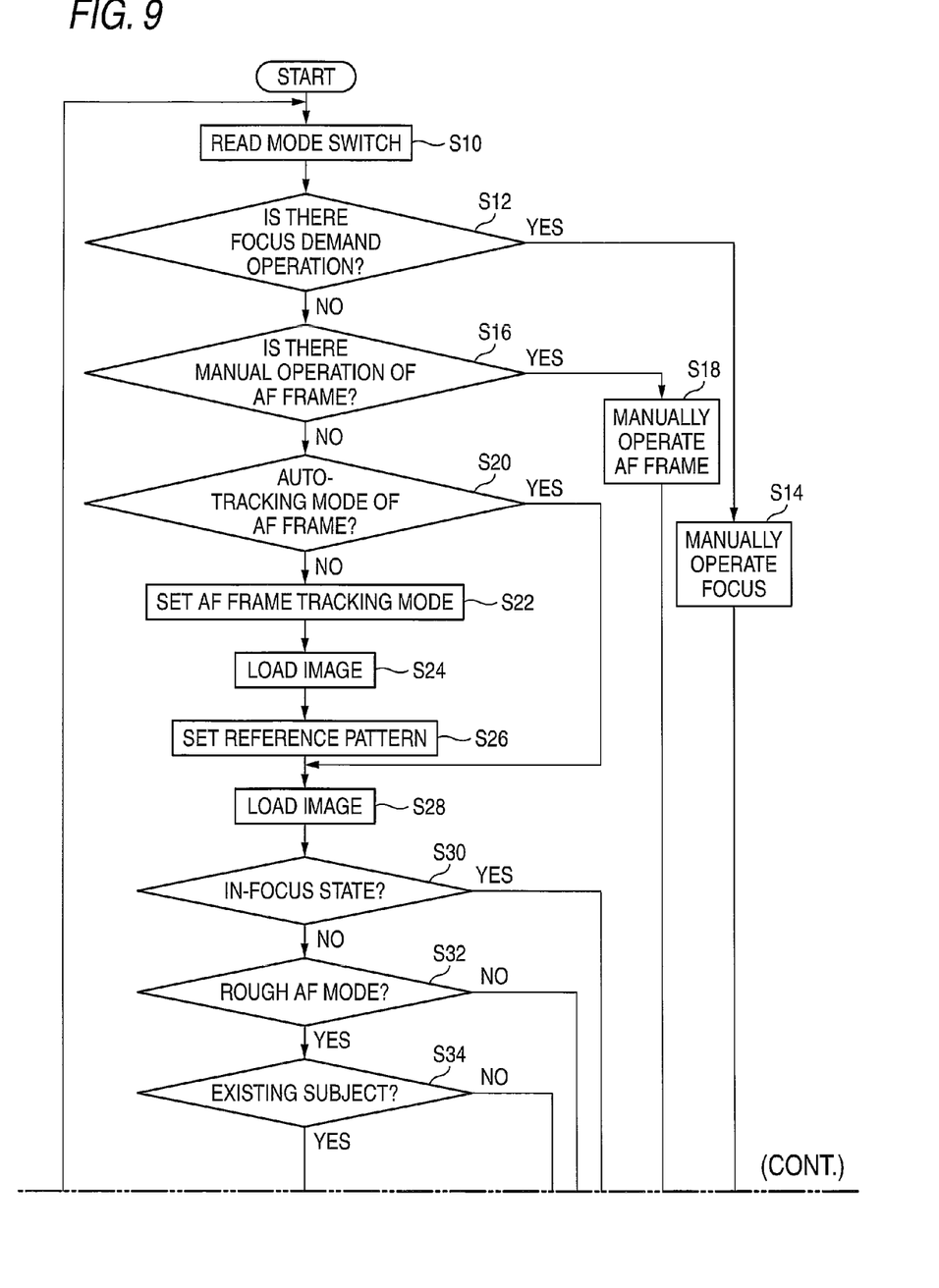
FIG. 9 is a flowchart illustrating a procedure of rough AF processing and AF frame auto-tracking processing in an operation unit CPU.

The above-mentioned rough AF processing and AF frame auto-tracking processing performed in the focus/AF-frame operation unit 16 are described with reference to the flowchart in FIG. 9.

First, the operation unit CPU 80 reads various mode switch states (step S10). Here, it is assumed that the AF mode is selected as the focus control mode, simultaneously the rough AF mode is on, and the AF frame auto-tracking mode is selected as the control mode of the AF frame.

Subsequently, it is determined whether or not the operation (the operation of the focus ring 120) of the focus demand 82 is performed (step S12). If YES is determined, an instruction signal for instructing the focus lens F to move to the position corresponding to the rotation position of the focus ring 120 is generated (step S14), and information thereof is transmitted to the lens CPU 50 of the lens unit 12 (step S50). Then, the flow returns to step S10. Furthermore, in the AF mode, when the focus ring 120 is operated, the focus lens F is also moved in accordance with the operation of the focus ring 120.

If NO is determined in step S12, subsequently it is determined whether or not the manual operation of the AF frame is performed (step S16). That is, it is determined whether or not the position operation member 100, the size operation member 102, or the shape operation member 104 of the focus/AF-frame operation unit 16 is operated. If YES is determined, the area of the AF frame is determined in accordance with the operation of the operation member (step S18), and information (AF frame information) thereof is transmitted to the lens CPU 50 of the lens unit 12 (step S50). Then, the flow returns to step S10.

If NO is determined in step S16, next it is determined whether or not the current mode is the AF frame auto-tracking mode (step S20). This determination is the same as the determination as to whether or not the processing from the current step S20 to step S26 is performed already after the AF frame auto-tracking mode is selected by the mode switch. If NO is determined, the AF auto-tracking mode is set so that YES is determined when the determination in step S20 is performed again (step S22). Subsequently, the image corresponding to one screen (one frame) is loaded from the video signal, which is input from the camera main body 14, and is recorded in the image memory 88 (step S24). Then, the image within the area of the current AF frame among the images recorded in the image memory 88 is set as a reference pattern representing a subject image as a tracking target (step S26).

If YES is determined in step S20, the processing from step S22 to step S26 is not performed, and the flow advances to step S28.

When the processing in step S26 is terminated since No is determined in step S20 or YES is determined in step S20, next the image corresponding to one screen (one frame) is loaded from the signal of video, which is captured by the AF-supported image pickup device C and is transmitted from the lens unit 12, and is recorded in the image memory 88 (step S28).

Subsequently, the operation unit CPU 80 acquires, from lens CPU 50, information on whether or not the subject is in focus in the normal AF processing performed in the lens CPU 50 of the lens unit 12, and determines whether or not the subject is brought into focus (step S30). Specifically, the lens CPU 50 acquires the information on the focus evaluation value from the AF CPU 60, and successively performs the normal AF processing, thereby controlling the focus lens F to bring the subject into focus. In a normal state, the tracking target subject as a tracking target within the area of the AF frame is in focus. However, it takes time to move the focus lens F to the focusing position by using the normal AF function. In addition, when the zoom lens Z is rapidly moved from the wide side toward the telephoto side, or when the lens-to-subject distance of the tracking target subject is rapidly changed, it is difficult to maintain the in-focus state, and a difference occurs in the focus evaluation values obtained from the AF-supported image pickup devices A and B. Further, when the difference in focus becomes large, the focus evaluation values obtained from the AF-supported image pickup devices A and B becomes infinitesimal values, and thus the AF function is not available. In such cases, it is possible to prevent the difference in focus from being increased in a way that the focus lens F is controlled by the rough AF function. In order to do that, it is determined in step S30 whether or not the subject is brought into focus, and then if NO is determined, the flow advances to the processing for the rough AF function.

If NO is determined in step S30, it is determined whether or not the rough AF mode is on (step S32). In the description, it is assumed that the rough AF mode is on, and thus YES is determined. If the rough AF mode is off, the processing from step S34 to step S40 is not performed, and the flow advances to step S42.

If YES is determined in step S32, the image processing circuit 90 detects the subject image, which is registered as the target subject of the rough AF function, in the AF frame area and in the peripheral image area through, for example, the pattern matching processing, and determines whether or not the target subject of the rough AF function exists in the image areas (step S34). Furthermore, the area for detecting the target subject of the rough AF function is associated with the AF frame area in order to decrease the processing time. When the processing time is not particularly necessary, the area for detecting the target subject of the rough AF function may be set as an entire area of the captured image (the image pickup screen), which is recorded in the image memory 88, corresponding to one frame. However, only when at least a part of the target subject of the rough AF function is included in the AF frame area and the target subject of the rough AF function is brought into focus, YES is determined in step S34. Further, the method of detecting the subject image registered as the target subject of the rough AF function is not limited to the pattern matching processing. For example, if the subject is the face of a person, a face recognition technique or a face identification technique may be used.

If NO is determined in step S34, the processing from step S36 to step S40 is not performed, and the flow advances to step S42. Furthermore, if YES is determined in step S34, subsequently the size (the horizontal size H1) of the target subject of the rough AF function in the image pickup screen is measured (step S36). Then, the lens-to-subject distance L is calculated based on Expressions (1) and (2) mentioned above by using the horizontal size H1 and the real horizontal size D of the target subject of the rough AF function, the horizontal angle of view θ in the photographing angle of view, and the known horizontal size H0 of the image pickup screen (step S38). Furthermore, the horizontal angle of view θ is calculated by acquiring the information on the current position of the zoom lens Z from the lens CPU 50.

Then, the operation unit CPU 80 transmits the information on the calculated lens-to-subject distance L to the lens CPU 50, and moves the focus lens F to the position at which the subject at the lens-to-subject distance L is brought into focus (step S40).

Next, the operation unit CPU 80 detects the image area, which is matched with the reference pattern, in the image recorded in the image memory 88 through the pattern matching processing in the image processing circuit 90 (step S42).

Subsequently, based on the determination as to whether or not the detected image area is different from the position detected at the previous time, it is determined whether or not the tracking target subject is moved (step S44). Furthermore, if the size (and the shape) of the detected image area is different from the size (and the shape) detected at the previous time, it is also determined that the tracking target subject is moved.

If YES is determined in step S44, the AF frame area is updated to the image area detected in step S42 (step S46), and the reference pattern thereof is updated to the image of the image area (step S48). Then, the information on the updated AF frame area is transmitted to the lens CPU 50 (step S50), and the flow returns to step S10. If NO is determined in step S44, the processing from step S46 to step S50 is not performed, and the flow returns to step S10.

As described above, in the embodiment, the rough AF function is performed under the situation in which the in-focus state is not obtained by the normal AF function. However, when the rough AF function is performed once and subsequently change does not occur in the size (the horizontal size H1) of the target subject of the rough AF function in the image pickup screen, the rough AF function may not be performed, and only the normal AF function may be performed.

Further, a mode for performing only the normal AF function or a mode for performing only the rough AF function may be selected without using the normal AF function and the rough AF function together.

Further, when a speed of zooming is a predetermined value or more, that is, when a speed of change in focal length of the optical system is a threshold value or more, the rough AF function may be performed. In contrast, when the speed of zooming is less than a predetermined value, that is, when the speed of change in focal length of the optical system is less than a threshold value, the normal AF function may be performed. In addition to these conditions, only when the zooming is performed from the wide side toward the telephoto side, the rough AF function may be performed.

Further, the embodiment describes only the case where the control mode of the AF frame is the AF frame auto-tracking mode. However, the rough AF function can be applied to the case of the manual mode regardless of the control mode of the AF frame.

Further, a plurality of substitute subjects may be previously registered as the target subject of the rough AF function. In this case, a method of selecting which substitute subject is the subject as the target brought into focus in the AF frame area may be automatically performed by the image processing, or an operator may perform the selection.

Furthermore, in the embodiment, the information on the target subject of the rough AF function is previously registered. Instead, the rough AF function may be performed in a way that the horizontal width of the target subject of the rough AF function is matched with the horizontal width of the AF frame by adjusting the AF frame area and the real horizontal size D of the target subject is input from predetermined input unit.

Further, in the embodiment, the horizontal size is used in order to calculate the lens-to-subject distance L. However, the lens-to-subject distance L may be calculated by using a vertical size or a size based on another direction.

Further, when the photography target is determined as a specific person, it is unnecessary to register the subject image as the target subject of the rough AF function, a face or an entire body of any person is extracted from the inside of the image pickup screen by the image processing circuit 90, and the lens-to-subject distance L may be calculated by using the size of the specific person who is registered previously.

Further, when many and unspecified persons are photographed, an average height and the like of group of the persons is previously registered, and the lens-to-subject distance L may be calculated by using the average height.

Further, a vehicle, an aircraft, or the like of which a photographing direction is changed may be set as the target subject of the rough AF function. In this case, if only 3-dimensional data (data on 3-dimensional shape and sizes) of the object is registered, the rough AF function can be used even when the photographing is performed at any angle.

Further, in the embodiment, the AF frame auto-tracking is performed through the pattern matching processing. However, another method may be employed as the AF frame auto-tracking method.

Further, the embodiment describes the aspect in which the AF function based on the optical path length difference method is performed by the plurality of AF-supported image pickup devices of which the image pickup surfaces are disposed at the positions at which the optical path lengths of those are different from each other. However, the method of the AF function is not limited to this. For example, the AF function may be performed by using one AF-supported image pickup device.

What is claimed is:

1. An autofocus system comprising:
   an image pickup unit that takes a subject image formed by an optical system;
   a target subject detection unit that detects a target subject, which is previously registered as an autofocus target, in a photographing image taken by the image pickup unit;
   a lens-to-subject distance calculation unit that calculates a lens-to-subject distance to the target subject based on information on a photographing angle of view depending on a focal length of the optical system, a size of the target subject in the photographing image, and a size of the target subject in real space;
   a rough AF unit that controls a focus of the optical system so as to bring into focus the subject which is located at the lens-to-subject distance calculated by the lens-to-subject distance calculation unit; and
   a normal AF unit, wherein
   the control of the focus is performed by the normal AF unit after the control of the focus is performed once by the rough AF unit and subsequently the size of the target subject in the photographing image does not change in the photographing image.

2. The autofocus system according to claim 1, wherein
   the normal AF unit controls the focus of the optical system so as to obtain an in-focus state in which a contrast of an image within an area of a predetermined AF frame in the photographing image taken by the image pickup unit becomes the maximum,
   wherein the control of the focus is performed by the rough AF unit when the in-focus state is not obtained by the normal AF unit.

3. The autofocus system according to claim 1, wherein
   the normal AF unit controls the focus of the optical system so as to obtain an in-focus state in which a contrast of an image within an area of a predetermined AF frame in the photographing image taken by the image pickup unit becomes the maximum.

* * * * *